Nov. 1, 1932.  E. A. ROCKWELL  1,885,767
POWER MECHANISM
Filed May 22, 1929   3 Sheets-Sheet 1

Inventor:
Edward A. Rockwell,

Nov. 1, 1932.  E. A. ROCKWELL  1,885,767
POWER MECHANISM
Filed May 22, 1929   3 Sheets-Sheet 2

Inventor:
Edward A. Rockwell,
By Wilkinson Huxley Byron Knight
Attys.

Patented Nov. 1, 1932

1,885,767

UNITED STATES PATENT OFFICE

EDWARD A. ROCKWELL, OF CHICAGO, ILLINOIS

POWER MECHANISM

Application filed May 22, 1929. Serial No. 365,071.

This invention relates to improvements in brake applying means especially adapted for motor vehicles and more particularly to improvements in brake applying means comprising a power brake device which derives its energy from the rotation of the power shaft of the vehicle and transmits a braking force to the wheel brakes.

In general, the present invention relates to improvements in the construction of power brake devices of the type disclosed in my co-pending application Serial No. 224,846, filed October 8, 1927. In my previous application I have disclosed power brake devices mounted on the transmission shaft of the vehicle which include a brake drum that is normally rotatable with the power shaft but may be retarded in its rotation by means under the control of the operator of the vehicle. The retardation of the brake drum causes the rotation of the transmission shaft to effectuate a longitudinal movement of a brake operating sleeve. This movement of the brake operating sleeve takes place independent of the direction of movement of the vehicle and, therefore, independent of the direction of rotation of the power shaft. The longitudinal movement of the brake operating sleeve imparts a thrust to a pivoted yoke lever which extends transversely to the power shaft and has connected to its outer end a lever which is adapted to be connected to the forwardly and rearwardly extending brake rods. Since the movement of the brake operating sleeve will take place very rapidly as it may require only a single rotation of the power shaft to effectuate the full movement of the brake operating sleeve, and, further since the retarding force supplied to the rotating brake drum may be somewhat uneven in its action, it is desirable that some form of means be provided to cushion the movement of the yoke member whereby the wheel brakes will be smoothly and evenly applied.

It is, therefore, the purpose of this invention to provide dash pot mechanism in a brake linkage whereby the action of the wheel brakes is made relatively more smooth and even since vibration of the brake-applying members, which may comprise either direct pedal connections or a power brake unit, are absorbed by the resistance to flow of the fluid in the dash pot chamber.

Another advantage of including the dash pot mechanism in a brake linkage, especially when used with a power brake device, is that sudden application of the brakes does not take place even at high speeds of the propeller shaft which actuates the power brake unit, however, the mechanism will permit a sudden application of the brakes if sufficient force is applied to the pedal thereby rendering it possible to make an emergency stop.

Another advantage of the dash pot mechanism is that, by suitable regulation, the movement of the brake shoes in returning from "on" to "off" position can be made as slow as desired. Thus in spite of a full release of a pedal control, the brakes will be momentarily retained in "on" positions. This is especially desirable when making successive applications of the brakes by intermittent movements of the pedal lever.

It is further the purpose of this invention to provide a power brake device of the type above mentioned which is directly combined with the dash pot mechanism in which the yoke member has connections to the dash pot whereby the operating sleeve of the power brake device may move to released position, while the yoke lever is maintained in "on" position.

It is an object of the present invention to so construct the casing of the power brake device that the dash pot plunger is enclosed within the lubricant chamber of the casing in such a manner that the lubricant acts as a fluid to cushion the movement of the dash pot plunger.

It is further an object of the present invention to provide a power brake device combined with a dash pot mechanism which will efficiently operate in spite of temperature differences causing changes in the consistency of the lubricant fluid.

Another object of the present invention is to so design the lubricant casing of the power brake device that the operating parts will be efficiently lubricated and to provide efficient oil sealing means to prevent the escape of the oil.

Further and additional objects of the present improvements will be more readily apparent from the following description taken in connection with the attached drawings in which—

Figure 1:
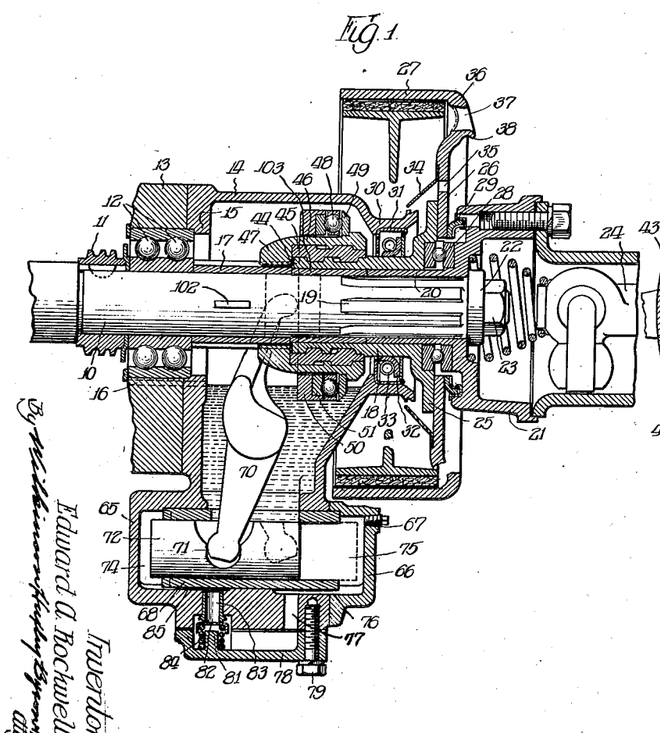
Figure 1 is a longitudinal section of the improved power brake device.
Figure 2:
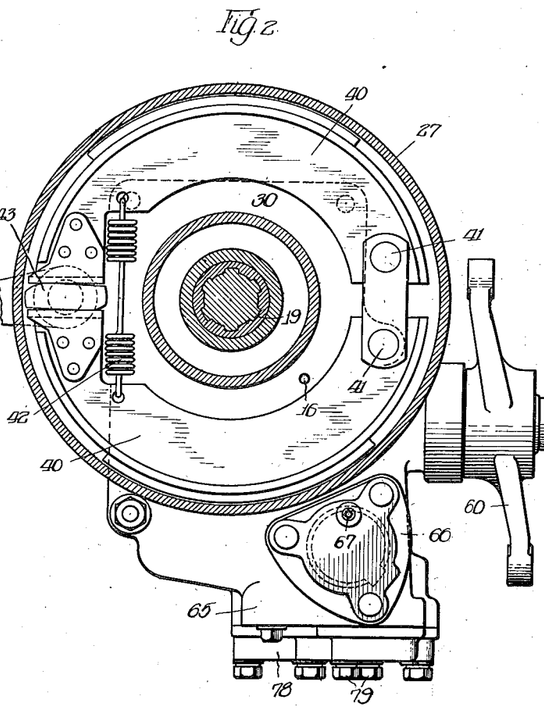
Figure 2 is an end elevation from the right hand end of Figure 1.

The construction of the power brake device as illustrated in Figure 1 is generally similar to that disclosed in my previously mentioned co-pending application. Thus I show a transmission shaft 10 having mounted thereon the customary speedometer worm 11 and rearward of said worm is provided a journal bearing 12. 13 is a portion of the transmission casing while 14 denotes generally the casing of the power brake device. The journal bearing 12 is held in place by the flange 15 of the casing 14. The lower portion of the casing 14 forms a lubricant chamber and the normal level of the lubricant is illustrated in Figure 1. The lubricant chamber is filled by removing the upper filling plug 100 and the overflow plug 101. The lubricant is introduced through the upper filling opening until there is a flow through the overflow opening. The plugs 100 and 101 may then be screwed into place. Any other desired means may be utilized to obtain the correct lubricant level. Between the casing 14 and the transmission casing 13 may be provided a lubricant passage 16 which is an opening of small diameter at the normal lubricant level and is so formed that changes in the inclination of the vehicle, as in traversing a steep hill, will not permit the lubricant from the transmission casing to fill the power brake casing. The lubricant passage 16 also tends to equalize the lubricant levels in the transmission casing and power brake lubricant casing since it will be understood that the bearing for the propeller shaft in the transmission case will tend to pass oil by the rotation of the propeller shaft into the power brake lubricant casing and the excess of oil which is collected in the power brake lubricant casing will be returned to the transmission casing through the passage 16. A splined spacing sleeve 17 bears against the rearward side of the journal bearing 12 and is keyed to the shaft 10 by the key 102. The rearward end of the spacing sleeve 17 bears against the forward end of a spacing sleeve 103. The rearward portion of the shaft 10 is formed with splines 19 which engage the sleeve portion 20 of the power connection member 21; thus the member 21 rotates with the power shaft 10 and is held in place by the washer 22 and the nut 23 which is screw-threaded to the rearward end of the shaft 10. The sleeve 20 is brought into abutting relation with the spacing sleeve 103 and the two sleeves serve as a bearing for the freely rotatable sleeve 18. Suitable connections may be made, as diagrammatically indicated in Figure 1, to transmit the rotation of the member 21 through the universal joint, or other means, to the Cardan shaft 24.

The sleeve 18 is freely rotatable with respect to the sleeve 20 and has a rearward flange portion 25 which may be secured by rivets or welding to the flange 26 of a brake drum 27. I show a thrust bearing 28 between the sleeve 18 and the member 21. Rearward of the flange 26 of the brake drum I may provide oil sealing means indicated generally at 29. The casing 14 is formed with a reduced rearwardly extending portion 30 which extends adjacent to the flange 25 of the sleeve 18. Since the sleeve 18 is rotatable with respect to the fixed cylindrical portion 30 of the casing 13, suitable oil sealing means is also provided. I, therefore, show a retaining channel member 31 and curved packing 32 which is held in place by a spring 33.

It is further necessary to prevent such oil as may escape through the oil sealing means from reaching the inner surface of the brake drum 27. An inclined deflector member 34 is mounted on the flange 26 of the brake drum in order to direct such oil as may leak out to pass through the openings 35. It should also be noted that the flange 26 of the brake drum is depressed relative to the outer curved portion 36. In the portion 36 may be formed ventilation openings 37. The surrounding lips 38 of the openings 37 are so designed that the oil passing through the openings 35 will not be deflected or blown back through the ventilation openings 37.

Numerals 40—40 designate internal expanding brake shoes adapted to engage the inner surface of the brake drum 27. The brake shoes 40—40 are pivotally mounted on pivots 41—41 and are normally held in "off" position by the tension spring 42. The brake shoes are expanded by the movement of the lug 43. Suitable connections may be provided similar to that shown in my co-pending application for selectively operating the lug 43 under the control of the operator.

The gripping action of the brake shoes 40—40 against the brake drum 27 will cause the brake drum 27 to be momentarily retarded in its rotation relative to the power shaft 10. This action will effectuate an operation of the power brake device in a manner to be now described: The forward end of the sleeve 18 has formed on its outer surface a left-hand spiral thread 44 which engages a corresponding internal thread on a double worm sleeve 45. The worm sleeve 45 is formed with an internal left-hand thread and an external right-hand spiral thread. The external thread engages a corresponding internal thread on a brake operating sleeve 46. The sleeve 46 is formed at its forward end with an inwardly flanged portion 47 which is keyed to rotate with the power shaft 10 by engaging with the splined spacing sleeve 17.

In the position shown in Figure 1, the members are in "off" position and it is apparent that the double worm sleeve 45 and the brake operating sleeve 46 are at the limit of their rearward movement. Rotation of the brake drum 27, together with the power shaft 10, will therefore not cause any movement of the brake operating sleeve 46, but upon the retardation of the brake drum 27, the momentary relative rotation between the brake drum 27 and the power shaft 10 will cause the brake operating sleeve 46 to be longitudinally and forwardly moved. Thus if the vehicle is forwardly moving, a clockwise rotation of the power shaft looking from the forward end will cause the sleeve 46 and the double worm sleeve 45 to rotate as a unit relative to the sleeve 18 and the left-hand worm will cause the sleeves 45 and 46 to laterally move. If, however, the power shaft is rotated in the opposite direction, as upon rearward movement of the vehicle, the sleeve 46 alone will laterally move while the double worm sleeve will remain at the limit of its rearward movement.

Upon the sleeve 46 is mounted a thrust bearing 48 between a ring 49 which abuts against a flange portion of the sleeve 46 and a forward ring 50. The bearing ring 51 for the roller bearings of the thrust bearing 48 is preferably of a relatively hard steel while the ring 50 may be less hard. As one instance of preferred manufacture, the race ring 51 may be 90 scleroscope while the thrust ring 50 may be only 75 scleroscope. The ring 50 receives the impact thrust of the yoke lever and must, therefore, be tough to resist breakage. It is apparent that the lateral movement of the sleeve 46 will carry with it the ring 50 and that the ring 50 may be held stationary during the rotation of the sleeve 46. The ring 50 has in thrust engagement therewith the upwardly extending arms 52 and 53 of the yoke member 54. The yoke member 54 includes a pivot bearing 55 which is supported by a wall of the casing 14 having a corresponding cylindrical opening 56. The other end of the lever 54 is supported by the bearing portion 57 of the casing 14 and includes a bearing shaft 58. Oil sealing means 94 are provided surrounding the bearing shaft 58 and may be similar to the sealing means shown surrounding the sleeve 18. To an outer reduced end 59 of the yoke member 54 is secured a double arm lever 60. The upper arm 61 of the lever 60 is formed with an opening 62 adapted to form a connection to one brake rod while the lower arm 63 is formed with an opening 64 adapted for connection to the oppositely extending brake rod.

Figure 3:
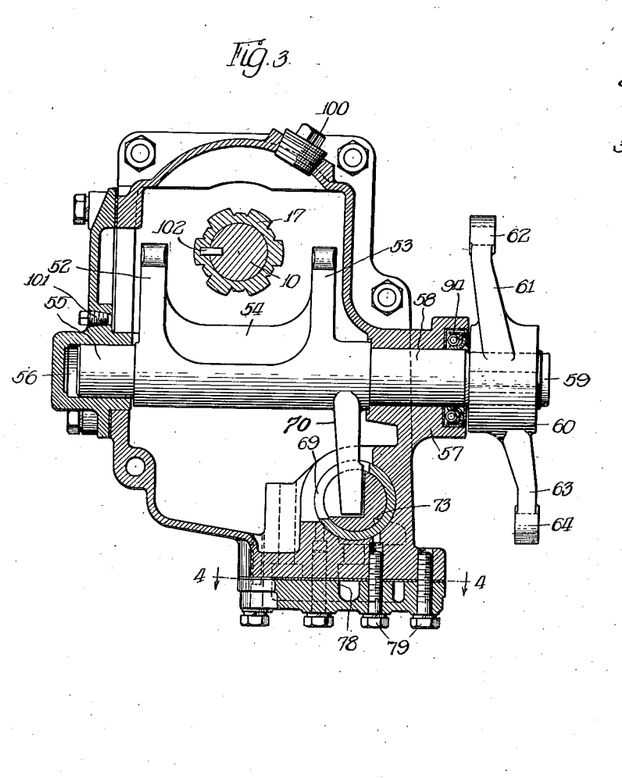
Figure 3 is a vertical sectional elevation taken through the mid portion of the power brake device and illustrating portions of the dash pot mechanism.

The lower portion of the casing 14 forms a dash pot chamber 65 which is closed at one end by the cap 66. The cap 66 is provided with a plug 67 which may be removed to bleed entrained air from the dash pot. Within the dash pot chamber is mounted a sleeve 68 which seats against the walls of the dash pot chamber 65, as will be evident from Figure 3, but is provided with an opening 69 through which may pass a depending arm 70 which is formed integral with the yoke member. The arm 70 is formed with a rounded end 71 which engages the dash pot plunger 72. The plunger 72 is designed to rather loosely fit the sleeve 68 whereby it may freely slide back and forth and will permit some leakage of oil past the sides of the plunger.

As a further means for permitting the flow of oil, I show in Figure 1 a groove 73 which extends throughout the length of the plunger 72. The groove 73 is formed on the lower side of the plunger 72 removed from the central opening of the sleeve 68 whereby the greater portion of the lubricant will flow through the groove and not be lost through the opening in the sleeve to the upper part of the lubricant chamber. In the position shown in Figure 1, the end opening indicated at 74 is the low pressure side while the opening 75 at the other end of the plunger is the high pressure side. Suitable valves are arranged to control the flow of the lubricant and provide for the correct operation of the dash pot plunger.

As more clearly shown in Figure 1, a passage 76 communicates from the high pressure side to an opening 77 which passes downwardly through the bottom of the dash pot chamber. To the bottom of the dash pot chamber is secured a die cast plate 78 which is secured by the bolts 79 extending through the bolt-receiving openings 80. The upper side of the plate 68 is shown in Figure 4.

Figure 4:
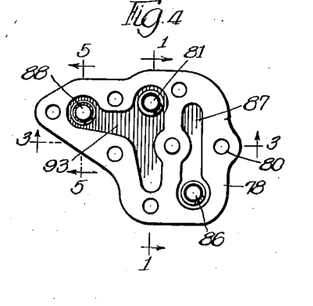
Figure 4 is a plan view of the die-cast valve cover illustrating the fluid passages and the seats for the valves.
Figure 5:
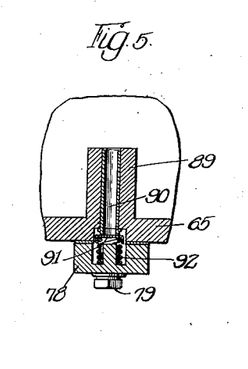
Figure 5 is a detail section taken on the plane indicated by 5—5 in Figure 4 and illustrating the snifter valve.

In Figure 4 is shown an upstanding stud 81 which forms a seat for the low pressure valve 82 shown in Figure 1. Valve 82 controls a passage 83 and is normally closed by the spring 84. The passage 83 communicates with a narrow passage 85 communicating with the low pressure end of the dash pot chamber. Also in Figure 4 is shown a stud 86 positioning the corresponding high pressure valve which admits fluid from the high pressure side through the passage 87 formed in the plate 78. To communicate with the passage leading from the low pressure side a third stud 88 forms a seat for a snifter valve, shown in detail in Figure 5. The snifter valve includes an upstanding cylindrical portion 89 having a passage 90 formed therein which is normally held closed by the valve cap 91 which is upwardly pressed by the spring 92. A passage 93 is formed in the cap 78 to communicate between the snifter valve and the low pressure valve and the passage 77 which extends to the high pressure side.

Thus in operation, when the brake operating sleeve 46 is laterally moved to the left, as in Figure 1, the yoke lever 54 will be turned to move the dash pot plunger 72 to the right. The movement of the plunger to the right will be resisted by the lubricant pressure developed at the high pressure end. Some leakage will be permitted through the groove 73 and around the sides of the plunger while the high pressure valve will finally be opened and permit the lubricant to flow through relatively large size passages to the opposite end of the dash pot chamber. During this movement the snifter valve and the low pressure valve will be maintained closed by the pressure of the lubricant. Upon the return stroke of the dash pot plunger the lubricant will be permitted to pass through the passage 85 beneath the sleeve 68 and open the low pressure valve which will permit the lubricant to flow to the high pressure end of the dash pot chamber. Further, during this operation, the snifter valve may open. This operation of the snifter valve prevents the exhaustion of the lubricant beneath the dash pot chamber and makes up for the oil which may be lost by passing around the sides of the dash pot plunger and upward into the lubricant chamber. It should be noted that the cylindrical passage for the snifter valve is raised about the lower level of the lubricant chamber whereby impurities in the oil will not be passed into the dash pot mechanism.

It is apparent that the use of the dash pot means will cushion any unevenness in the operation of the brake operating sleeve due to the intermittent gripping of the brake shoes on the brake drum and provide for a smooth and even operation of the lever 60.

The action of the low pressure valve is important in permitting the release of the wheel brakes by the pull-back springs. It is desirable that the return be relatively slow although the return of the brake pedal may be rapid. Thereby successive applications of the brakes may be had by substantially full movements of the pedal while the brake linkage is momentarily held in "on" position by the resistance of the dash pot mechanism. The coming off movement of the wheel brakes may be adjusted by regulating the pressure of the low pressure valve.

Figure 6:
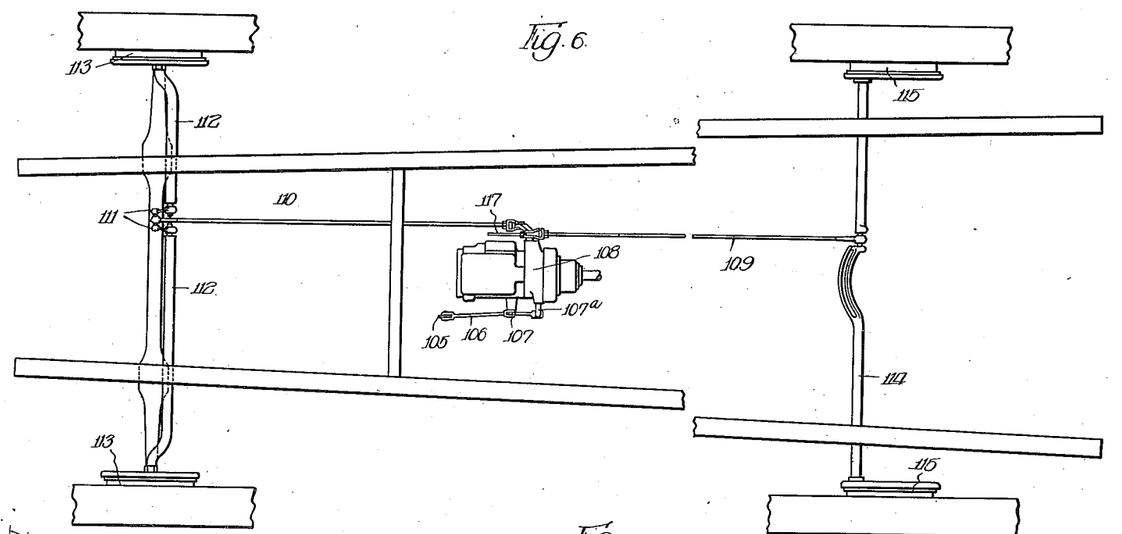
Figure 6 is a diagrammatic plan elevation of a portion of a chassis frame illustrating the connection of the power brake unit to the wheel brakes.
Figure 7:
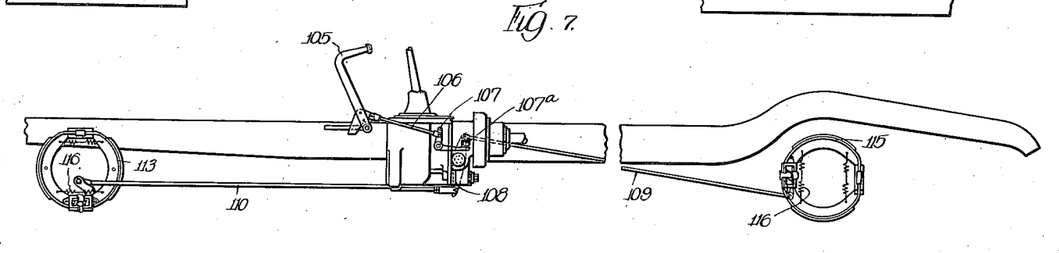
Figure 7 is a diagrammatic side elevation of Figure 6.

As illustrative of the manner in making connections from the power brake unit to the wheel brakes, Figures 6 and 7 are diagrammatic views of a desirable system of brake connections. It will, however, be apparent that many other connections may be utilized without departing from the spirit of the invention. Thus I show a pedal 105, operating a connecting link 106, which link is connected to the input arm 107 of the power brake unit 108. The output lever 108 has connected to its upwardly extending arm the rearwardly extending brake rod 109, and to its downwardly extending arm the front brake rod 110. The front brake rod 110 has connections through the levers 111 to the transverse brake operating members 112 which actuate the front wheel brakes 113. The rear brake rod 109 has connections to the transverse brake operating member 114 which actuates the rear brakes 115. Numerals 116—116 are the pull-back springs for releasing the brake shoes and holding them normally in "off" positions. 117 may be a connection to the emergency lever control. It will be apparent that by stepping upon the pedal lever the operator may control the actuation of the power brake unit. The dash pot mechanism will prevent the brakes being suddenly thrown on by the action of the power brake device which might readily occur due to a high speed of rotation of the transmission shaft. When the operator releases the pressure upon the pedal 105, the operating parts of the power brake device, except the yoke lever, will be returned to "off" position, but, as previously stated, the remainder of the brake linkage will slowly return dependent upon the adjustment of the low pressure valve.

Various changes and modifications may be made in the particular arrangement and construction of my improved brake mechanism without departing from the principles of my invention as expressed in the appended claims.

I claim:

1. In combination, a vehicle power shaft, a power brake device deriving its energy from the rotation of said power shaft, said power brake device including a lubricant receiving casing, an operative member for applying the vehicle brakes extending outward of said casing and means enclosed within the casing for cushioning the movement of said brake applying member.

2. In combination, a vehicle power shaft, a power brake device surrounding said power shaft and deriving its energy from the rotation of said power shaft, said power brake device including a lubricant receiving casing and a brake applying lever member supported by said casing and extending outwardly therefrom, said brake applying member being operated by the actuation of said power brake device and a dash pot plunger within said casing, said dash pot plunger being arranged to move with said brake applying member and cushion the movement thereof.

3. In combination, a vehicle power shaft, a power brake device deriving its energy from the rotation of said power shaft, said power brake device comprising a casing supported by said power shaft, said casing forming at its lower end a dash pot chamber, a brake applying lever member mounted on an axis transverse to said power shaft and supported by the walls of said casing, said lever member including a depending arm and a dash pot plunger slidable within said dash pot chamber and adapted to move with said depending arm.

4. In a device of the class described, a power shaft, a brake operating sleeve laterally movable relative to said shaft, said sleeve being rotatably secured to said shaft, a brake applying lever member transversely mounted with respect to said power shaft, said brake applying member being normally in thrust engagement with said sleeve and adapted to be actuated by the movement of said sleeve, and dash pot means for cushioning the movement of said brake applying member.

5. In combination, a vehicle power shaft, a brake operating sleeve arranged for lateral movement with respect to said power shaft, a brake applying lever, said lever having an arm in thrust engagement with said sleeve, means for effectuating a lateral movement of said sleeve, said movement being transmitted to said lever and means for cushioning the movement of said lever.

6. In combination, a vehicle power shaft, a brake operating sleeve arranged for lateral movement with respect to said power shaft, a brake applying lever, said lever having an arm in thrust engagement with said sleeve, means for effectuating a lateral movement of said sleeve, said movement being transmitted to said lever and means for cushioning the movement of said lever by fluid displacement.

7. In combination, a vehicle power shaft, a brake operating sleeve arranged for lateral movement with respect to said power shaft, a brake applying lever, said lever having an arm in thrust engagement with said sleeve, a dash pot chamber and a dash pot plunger, said plunger being connected to move with said lever.

8. In combination, a vehicle power shaft, power amplifying means mounted on said power shaft under the selective control of an operator arranged to transmit an increased braking force to the wheel brakes, said means including a lateral movable sleeve, an output arm in engagement with said sleeve and means for cushioning the movement of said output arm by fluid displacement.

9. In combination, a vehicle power shaft, a lubricant casing enclosing said power shaft, operating members mounted on said power shaft within said casing, said members including a laterally movable sleeve, a transverse yoke member pivotally mounted by the walls of said casing, the arms of said yoke member being in thrust engagement with said sleeve, said yoke member including an additional depending arm within said casing, said casing forming at the bottom thereof a dash pot chamber and a piston slidable within said chamber, said piston being arranged to move with said arm.

10. In combination, a vehicle power shaft, a lubricant casing surrounding said power shaft, operating members supported by said power shaft enclosed by said casing, said members including a laterally movable sleeve, a pivoted yoke member supported by said casing, the arms of said yoke being in thrust engagement with said sleeve, one end of said yoke lever extending outside of said casing, a brake applying member secured to said outwardly extending end of said lever and said yoke lever also including a depending arm within said casing, a dash pot piston within said casing, said piston being connected to move with said depending arm and means for cushioning the movement of said piston by fluid displacement.

11. A power brake unit including a lubricant casing, a dash pot chamber at the lower portion of said lubricant casing, a guiding sleeve supported by said lubricant casing, a dash pot plunger slidable in said sleeve and an operating arm for said plunger, said guiding sleeve having an opening to receive said operating arm.

12. A power brake unit including a lubricant casing, a dash pot chamber at the lower portion of said lubricant casing, a guiding sleeve supported by said lubricant casing, a dash pot plunger slidable in said sleeve and an operating arm for said plunger, said guiding sleeve having an opening to receive said operating arm, said plunger having a groove at the lower side thereof permitting the passage of a portion of the lubricant between the ends of said plunger upon movement of said plunger.

13. A power brake unit including a lubricant casing, a dash pot chamber at the lower portion of said chamber, a guiding sleeve supported by said lubricant casing, a dash pot plunger slidable in said sleeve, an operating arm for said plunger, said guiding sleeve having an opening to receive said operating arm and a valve controlled passageway beneath said sleeve extending from one end of said dash pot chamber to the other end thereof;

said pasageway permitting the lubricant to flow therethrough upon movement of said plunger in one direction.

14. A power brake unit including a lubricant casing, a dash pot chamber at the lower portion of said lubricant casing, a dash pot plunger slidable in said dash pot chamber, a removable valve cover secured to the lower portion of said lubricant casing, a pair of studs on said valve cover, valve springs positioned by said studs and valves controlled by said springs, said valves controlling passageways between the opposite ends of said dash pot chamber and permitting flow of lubricant upon movement of said dash pot plunger in opposite directions.

15. In combination, a rotatable power shaft, a sleeve slidable on said shaft, a lubricant casing enclosing said sleeve, a pivoted yoke member mounted transverse to the power shaft and below said power shaft, said pivoted yoke lever including yoke arms upwardly extending and normally in thrust engagement with said sleeve, said yoke lever including a bearing shaft supported by said lubricant casing, one end of said shaft extending through said lubricant casing and oil sealing means preventing escape of oil from said lubricant casing around said bearing shaft.

16. In combination, a rotatable power shaft, a laterally movable sleeve on said power shaft, a thrust bearing mounted on said sleeve, said thrust bearing including a relatively hard outer race ring, a thrust ring in close contact with said race ring and slidable with said sleeve, said thrust ring being slightly softer than said race ring and a pivoted operating lever having yoke arms in thrust engagement with said thrust ring.

17. In combination, a power shaft, a brake on said power shaft, said brake including a brake drum normally rotatable with said power shaft, internally expanding friction members, a lubricant casing surrounding said power shaft and having an open end extending adjacent to said brake drum, said open end enclosing the supporting hub of said brake drum and deflector means fixed to the flange of said brake drum adjacent to the open end of said lubricant casing, said brake drum having openings formed therein adjacent said deflector means, said deflector means preventing the discharge of lubricant on to the internal braking surface of said brake drum.

18. In combination, a power shaft, a brake on said power shaft, said brake including a brake drum normally rotatable with said power shaft, internally expanding friction members, a lubricant casing surrounding said power shaft and having an open end extending adjacent to said brake drum, said open end enclosing the supporting hub of said brake drum, deflector means fixed to the flange of said brake drum adjacent to the open end of said lubricant casing, said brake drum having openings formed therein adjacent said deflector means, said deflector means preventing the discharge of lubricant on to the internal braking surface of said brake drum, said brake drum having ventilating openings through its flange adjacent the internal braking surface and ferrules mounted in said ventilating surface, said ferrules acting as baffles to prevent oil from passing back through said ventilating openings.

19. In combination, a lubricant chamber, a dash pot in the lower portion of said lubricant chamber, said dash pot including a piston, a cylinder formed by the walls of said lubricant chamber, said piston cylinder having an opening at its central portion into the upper portion of said lubricant chamber, a piston guided within said piston cylinder, said piston cylinder closely fitting the ends of said piston but permitting some leakage of lubricant past the sides of said piston to the central cylinder opening, said dash pot cylinder having independent passageways extending between the opposite ends of said cylinder, valves controlling said passageways, said valves being so arranged that movement of said piston in one direction will cause one of said valves to open and the other of said valves to be held closed and a third valve controlling a passage from the upper portion of said lubricant chamber to one end of said dash pot cylinder, said third valve permitting lubricant to be sucked into the dash pot to make up for the lubricant lost through the central opening of said cylinder.

20. In combination, a lubricant chamber, a dash pot at the lower portion of said lubricant chamber, said dash pot including a guiding sleeve forming a piston cylinder, a piston guided by said sleeve, the ends of said cylinder being closed by the walls of said lubricant chamber, said guiding sleeve having a central opening in its upper portion into the upper portion of said lubricant chamber, said piston being so arranged as to closely fit its guiding sleeve but permitting some leakage from the ends of said cylinder to the central opening of said sleeve and a valve-controlled passageway communicating with one of the ends of said cylinder and opening into the upper portion of said lubricant chamber whereby the lubricant which is lost through the central opening of said sleeve will be made up by the sucking in of additional lubricant through said valve-controlled passageway.

21. Brake mechanism comprising a drive shaft, a braking element impositively rotated by said drive shaft, non-rotatable braking means associated therewith, operator-controlled means for bringing said braking element and said braking means into frictional engagement whereby said braking element is retarded in its rotation with respect to said drive shaft, secondary braking means brought into operation by the retardation of said braking element and means for cushioning the retardation of said braking element with a dash pot action for providing a smooth application of said secondary braking means.

22. Brake mechanism for motor vehicles comprising a propeller shaft, a braking element impositively rotated by said propeller shaft, non-rotatable braking means associated therewith, pedal-controlled linkage for bringing said braking element and said braking means into frictional engagement whereby said brake element is retarded in its rotation with respect to said drive shaft, brake linkage arranged to be moved by the retardation of said braking element, wheel brakes brought into operation by the movement of said brake linkage and means for cushioning the movement of said brake linkage with a dash pot action for providing a smooth operation of the wheel brakes.

23. Brake mechanism for motor vehicles comprising pedal linkage controllable by an operator, a propeller shaft, relatively rotatable and non-rotatable braking elements associated with said propeller shaft adapted to be brought into frictional engagement by the movement of said pedal linkage, said rotatable braking element being carried by said propeller shaft and impositively driven thereby, output brake linkage moved by the retardation of said rotatable braking element with respect to said shaft, wheel brakes brought into operation by the movement of said output brake linkage and means for preventing immediate application of the wheel brakes by movement of the pedal linkage by resisting the movement of the output brake linkage proportionate to the speed of actuation thereof.

24. Brake mechanism for motor vehicles comprising a propeller shaft, power brake means associated with said shaft, pedal-controlled means for bringing said power brake means into operation, output brake linkage moved by operation of said power brake, wheel brakes brought into action by the movement of said output brake linkage and means for cushioning the movement of said output brake linkage in either direction by a dash pot action, said last-named means presenting a greater resistance to movement in the direction for applying the wheel brakes than in the opposite direction.

25. In combination, a vehicle power shaft, power brake means deriving amplified energy from rotation of said power shaft, a lubricant receiving casing enclosing said power brake means and dash pot means removably supported in association with said power brake means within said casing.

26. In a power brake device, a propeller shaft, a lubricant receiving casing enclosing said propeller shaft, operative elements enclosed within said casing and dash pot means enclosed within said casing removably supported in association with one of said operative elements.

27. In a power brake device, a propeller shaft, a lubricant receiving casing enclosing said shaft, an operative element pivotally supported by the walls of said casing, a guiding sleeve member removably supported within said casing, a removable cap member secured to said casing holding said sleeve in place and a dash pot piston slidable in said sleeve and associated with said operative element.

28. In combination, a power shaft, a power brake device deriving amplified energy from the rotation of said power shaft, said power brake device including a lubricant receiving housing, a dash pot piston slidable in the bottom of said housing and an output lever pivotally supported by said housing and engaging said dash pot piston.

29. In a power brake device, a rotatable power shaft, a laterally movable sleeve on said power shaft, a thrust bearing mounted on said sleeve, said thrust bearing including a relatively hard race ring, a thrust ring in contact with said race ring and movable with said sleeve, said thrust ring being slightly softer than said race ring, a pivoted output shaft and lever arms for transmitting the lateral movement of said sleeve to said shaft, said lever arms being in thrust engagement with said thrust ring.

30. Brake mechanism for motor vehicles comprising pedal linkage controllable by an operator, a propeller shaft, relatively rotatable and non-rotatable braking elements associated with said propeller shaft adapted to be brought into frictional engagement by the movement of said pedal linkage, said rotatable braking element being carried by said propeller shaft and impositively driven thereby, output brake linkage moved by the retardation of said rotatable braking element with respect to said shaft, wheel brakes brought into operation by the movement of said output brake linkage and retarding means for decreasing the force applied to the wheel brakes during the initial application thereof.

31. Brake mechanism for motor vehicles comprising pedal linkage controllable by an operator, a propeller shaft, relatively rotatable and non-rotatable braking elements associated with said propeller shaft adapted to be brought into frictional engagement by the movement of said pedal linkage, said rotatable braking element being carried by said propeller shaft and impositively driven thereby, output brake linkage moved by the retardation of said rotatable braking element with respect to said shaft, wheel brakes brought into operation by the movement of said output brake linkage and retarding means intermediate the pedal linkage and the wheel brakes operative to decrease the force supplied to the brakes during the initial application thereof, dependent upon the rate of application of the pedal linkage.

32. Brake mechanism for motor vehicles comprising a propeller shaft, power brake means associated with said shaft, pedal-controlled means for bringing said power brake means into operation, output brake linkage moved by operation of said power brake, wheel brakes brought into action by the movement of said output brake linkage, means for controlling the rate of application of said output brake linkage and means for controlling the rate of release of said output brake linkage, said last-named means being effective to provide a slower releasing movement than applying movement.

33. In combination, a power shaft, a power brake casing enclosing a portion of said power shaft, a rock shaft having lever arms projecting laterally therefrom, said rock shaft being pivoted on an axis transverse to said power shaft and below the same, said casing having a side opening through which said rock shaft may be assembled and a pivot bearing opening on the opposite side of said casing through which one end of said rock shaft extends, and a cover adapted to be secured to said casing to close said entrance opening, said cover having a socket bearing for the other end of said rock shaft.

34. In combination, a power shaft, a power brake casing enclosing a portion of said power shaft, a rock shaft having lever arms projecting laterally therefrom, said rock shaft being pivoted on an axis transverse to said power shaft and below the same, said casing having a side opening through which said rock shaft may be assembled and a pivot bearing opening on the opposite side of said casing through which one end of said rock shaft extends, and a cover adapted to be secured to said casing to close said entrance opening, said cover having a socket bearing for the other end of said rock shaft, said lever arms which project laterally from said rock shaft being enclosed within said casing, two of said lever arms projecting upwardly to form operating yoke levers and another of said lever arms projecting downwardly.

35. In combination, a power shaft, a power brake casing enclosing a portion of said power shaft, dash pot mechanism included within said casing at the lower portion thereof, and a rock shaft mounted in said casing below said power shaft and transverse thereto, said rock shaft including three integral lever arms, two of which lever arms extend upwardly adjacent to the horizontal center line of said power shaft and the other of said lever arms extending downwardly for engagement with said dash pot mechanism.

36. In combination, a power shaft, a power brake casing enclosing a portion of said power shaft, dash pot mechanism included within said casing at the lower portion thereof, and a rock shaft mounted in said casing below said power shaft and transverse thereto, said rock shaft including three integral lever arms, two of which lever arms extend upwardly adjacent to the horizontal center line of said power shaft and the other of said lever arms extending downwardly for engagement with said dash pot mechanism, said casing having a relatively large opening at one side through which said rock shaft together with said integral lever arms may be assembled, and a cover adapted to be secured to said casing to close said entrance opening.

37. In combination, a casing, an operating member mounted in said casing, said member comprising a pivot shaft, upwardly extending yoke arms and a depending arm, said casing having a bearing opening at one side to receive one end of said pivot shaft, said casing having an entrance opening on the opposite side through which said operating member may be assembled, a cover for said entrance opening, said cover having a bearing socket for the other end of said pivot shaft, said pivot shaft extending through and beyond said bearing opening in said casing, and a lever having oppositely extending arms attached to the outwardly extending end of said pivot shaft.

38. In combination, a power shaft, a power brake casing enclosing a portion of said power shaft, a rock shaft supported by said casing, said rock shaft being mounted below said power shaft and transverse thereto, upwardly extending yoke arms integral with said rock shaft and enclosed within said casing, said casing having an entrance opening on one side through which said rock shaft together with said yoke arms may be assembled, a pivot bearing formed on the other side of said casing and supporting one end of said rock shaft, oil sealing means mounted in said pivot bearing and a brake lever mounted on the outwardly extending end of said rock shaft.

Signed at Chicago, Illinois, this 16th day of May, 1929.

EDWARD A. ROCKWELL.